Figure 1:
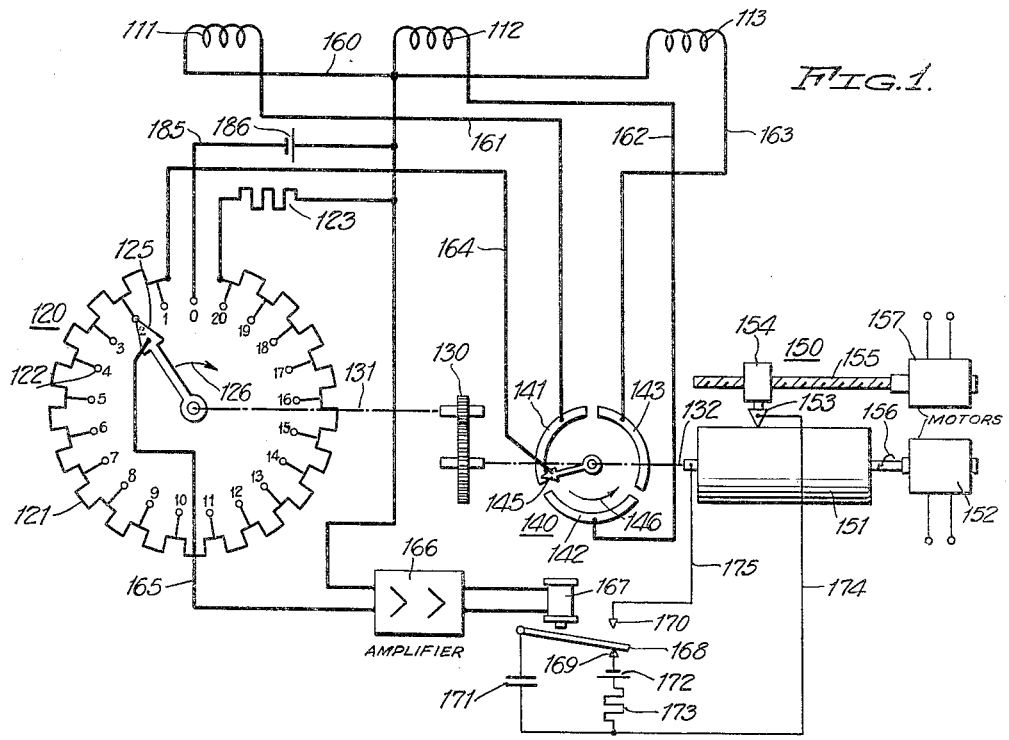

Oct. 30, 1945.  G. KEINATH  2,387,760
MULTIPLE RECORDER
Filed Dec. 24, 1942    3 Sheets-Sheet 1

INVENTOR.
GEORGE KEINATH.
BY

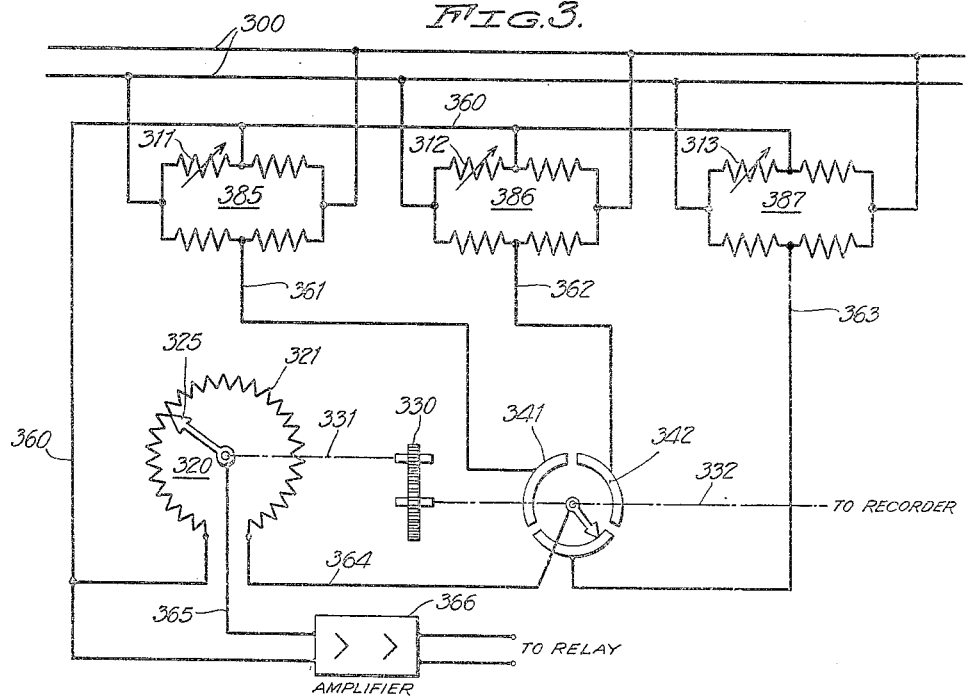
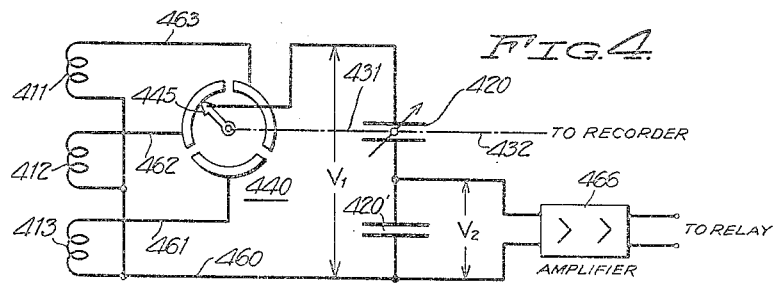
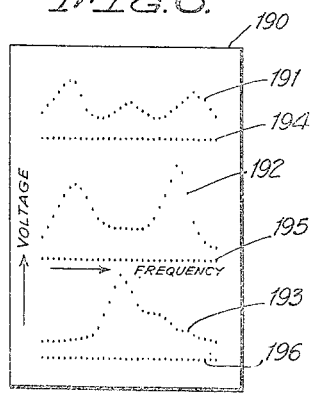
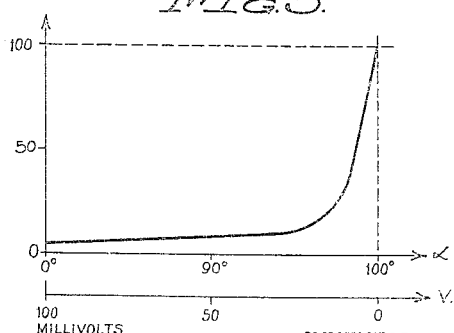

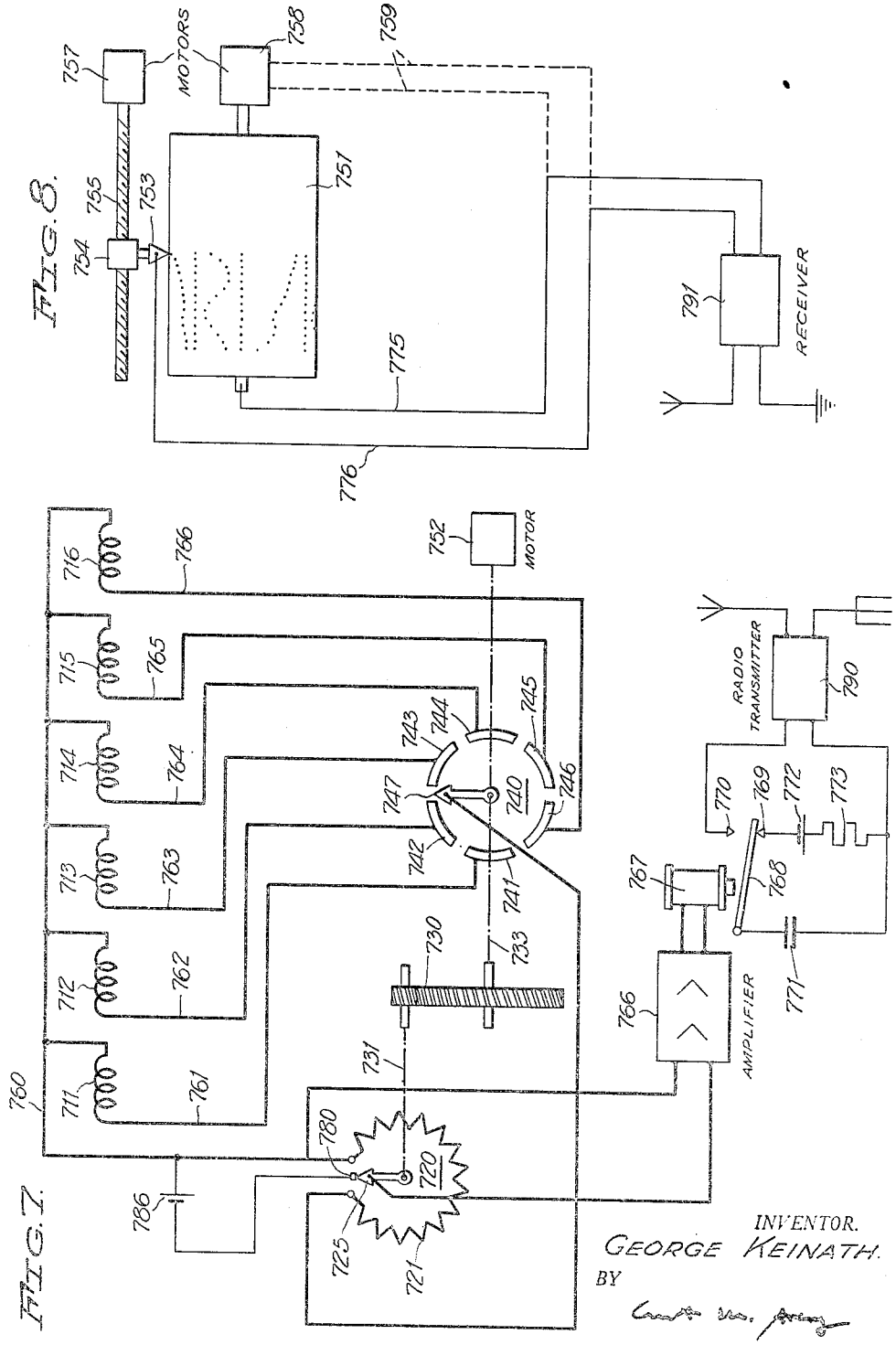

Patented Oct. 30, 1945

2,387,760

UNITED STATES PATENT OFFICE 2,387,760

MULTIPLE RECORDER

George Keinath, Larchmont, N. Y.

Application December 24, 1942, Serial No. 470,088

6 Claims. (Cl. 234—1.5)

My invention relates to electrical measuring systems for controlling a mechanism, such as a recording apparatus, in response to variable control or measuring magnitudes and in some of its aspects is related to my copending application, Serial No. 402,170, filed July 12, 1941, now to issue as U. S. Patent No. 2,306,391.

The just-mentioned patent describes measuring systems which contain a cyclically operating potentiometer with a series of graduated resistance steps as an essential adjusting element of a measuring and relay circuit, this potentiometer being controlled in synchronism with one of the two cooperative members of a recorder. The same patent also discloses a system capable of producing a plurality of records on a single recording chart in accordance with an equal plurality of independently variable control magnitudes. Such a multiple recording system, as described in the patent, requires a cyclically operating potentiometer with as many resistance units, each subdivided into a number of steps, as are magnitudes to be measured.

It is among the objects of my present invention to provide measuring and recording systems related to those of the above-mentioned type which are of simpler construction, or which permit being applied to other and more diversified uses, or which combine in themselves both of these advantages. More specifically, an object of the invention is the provision of a multiple recorder for measuring a plurality of independent measuring magnitudes in which a single potentiometric resistance unit is employed for obtaining the desired multiple-record chart. Another object is to operate a recording system with a cyclically actuated resistance or impedance member, preferably of the potentiometric type, which requires no subdivision into a fixed number of contact steps but varies continuously. The invention also aims at devising a recorder system of the type here in point so as to be applicable to measuring not only voltage variations but any variable magnitudes capable of being represented by corresponding variations of electric circuit members and measured in a measuring circuit by means of an adjustable impedance member.

The means according to the invention for achieving these ends will be understood from the following description of the embodiments illustrated in the drawings in which Figs. 1 through 4 show the circuit diagrams of four different measuring systems each serving for recording a plurality of different variable magnitudes in a corresponding number of diagrams depicted on a single recording chart. Fig. 5 is an explanatory diagram relating to the embodiment of Fig. 4, and Fig. 6 represents a recording chart as obtained in either embodiment. Figs. 7 and 8 relate to a fifth embodiment and represent the transmitter circuit and receiver circuit, respectively, of a system for transmitting measuring values, for instance from an airplane, to a remote receiving station.

The system shown in Fig. 1 serves for testing aircraft or other composite structures as to vibration properties. A plurality of vibration-responsive pick-up coils, exemplified by the three coils 111, 112 and 113, is provided. These coils are attached to the structure to be tested so that each of them is located in a different spot where undue vibrations are apt to occur if the structure is over-stressed or damaged at or near that spot. One terminal of each coil 111, 112 and 113 is connected to a common main lead 160. The other terminals of the coils are individually connected through respective leads 161, 162 and 163 with a corresponding number of contact segments 141, 142 and 143 of a contact device 140. The rotary contact 145 of this device, when in operation, engages the segments 141, 142 and 143 sequentially while rotating in the direction of the arrow 146. The rotary contact 145 is connected by conductor 164 with one terminal of a resistance unit 121 which forms part of a potentiometric device 120. The other terminal of resistance unit 121 is connected through a resistor 123 with the common lead 160 of the pick-ups 111, 112 and 113.

The resistance unit 121 of the potentiometric device 120 is subdivided into a number of resistance steps and contains a corresponding number of contacts marked 20, 19, 18, 17, etc., through 1. A further contact, marked 0, is provided between steps Nos. 20 and 1. This contact 0 is connected by lead 185 with the common lead 160 over an auxiliary current source 186. Contacts 0, and 1 through 20 are engaged sequentially by the rotary potentiometer contact 125 when the latter is set in rotation. The direction of rotation, contemplated in this embodiment and corresponding to the one chosen for the contactor 140, is denoted by the arrow 126. The potentiometer contact 125 is connected through lead 165 with one input terminal of an amplifier 166 whose other input terminal is in connection with the common lead 160 of the pick-ups. The output circuit of the amplifier 166 is connected to a relay 167. The relay has a movable contact 168 and two stationary contacts 169 and 170.

The elements and leads described so far form a measuring circuit capable of operating the relay in dependence upon the variations of the magnitude to be measured. In the illustrated position of contact 145, the pick-up coil 111 is connected through lead 161, segment 141, contact 145, lead 164, and also through lead 160 and resistor 123 with the ends of the resistance unit 121. Consequently, the voltage across the resistance unit 121 depends upon the instantaneous voltage generated in coil 111. The amplifier 166 and the relay 167 are energized in accordance with the voltage drop between one end of resistance unit 121 and contact 125. This voltage drop is a minimum when contact 125 starts its travel at contact 20 and increases stepwise as contact 125 moves along in the direction of the arrow 126. The initial minimum value of the effective voltage drop depends on the rating of resistor 123. This rating, as well as that of the unit 121, is adapted to the sensitivity of the relay 167. That is, the minimum value (threshold value) of the voltage necessary for causing the relay 167 to respond is so chosen relative to the resistance value of resistor 123 that under normal operating conditions the relay remains nonresponsive when the potentiometer contact 125 engages contact 20. When progressing on its path of travel, contact 125 will reach a resistance step where the voltage drop effective in the relay 167 is sufficient to exceed the threshold value so that now the relay 167 is sufficiently energized to switch its movable contact 168 from contact 169 to contact 170. The angular position of the potentiometer contact 125 in which this occurs depends on the voltage then supplied by the pick-up 111. Consequently, this instantaneous position of contact 125 is indicative of the magnitude to be measured. After the completion of each cycle, i. e. when contact 125 leaves contact No. 20, the relay armature 168 drops back to contact 169 so as to recharge the condenser 171. However, before reaching contact No. 1, the contact 125 passes over contact 0 and thus energizes the amplifier 166 and the relay 167 from the battery 186. Thus a discharge from condenser 171 is also passed through the pilot circuit each time a new cycle is started. As a result, the recording mechanism is caused to produce a zero mark on the recording sheet.

The measuring operation is repeated as regards the pick-ups 112 and 113 when the contact 145 of the device 140 is in engagement with the segments 142 and 143 respectively.

A recording mechanism 150 is provided for producing a multiple chart in accordance with the successive measuring operations of the above-described arrangement. The recording mechanism contains a drum 151 for accommodating on its peripheral surface a recording sheet of current-responsive, preferably electrolytic, type, the drum 151 serving as one of the electrodes for passing an electric current through the sheet. The second electrode consists of a stylus member 153 which is attached to a holder 154. This holder engages a worm shaft 155 actuated by means of a motoric device 157. During a measuring period the stylus 153 progresses gradually along the drum 151 with a speed depending upon that of the motoric drive 157. At the same time, the drum 151 is rotated by means of another drive motor 152 connected with the drum by a shaft 156. For the purposes of determining the vibration properties of a structure, as set forth in the foregoing, the motor 152 is actuated in proportion to time. That is, it may consist of a synchronous motor fed from an A. C. source of sufficiently constant frequency; or some other drive motor of constant speed such as a clockwork may be used. For testing vibration properties the motoric drive 157 is actuated in dependence upon the frequency of the vibration generator. When testing airplanes, for instance, the vibration frequency is dependent on the rotational speed of the engine. Consequently the motor 157 may be connected with a generator driven by the aircraft engine and supplying a voltage proportional to the engine speed. In other words, the speed of progression of the stylus member 153 in this embodiment is proportional to the test frequency. Another means of actuating the stylus member in this manner is to use a tachometer as a driving motor 157.

The drum member 151 of the recording mechanism is connected by a lead 175 with the stationary relay contact 170. The stylus electrode 153 is in connection through lead 174 with a discharge circuit extending between the movable contact 168 and the stationary contact 169 of the relay. This discharge circuit includes a condenser 171, a current source 172, and a resistor 173. In the illustrated inoperative position of the relay contacts, the condenser 171 is charged from the current source 172. As soon as the relay 167 responds, the movable contact 168 establishes a connection of the condenser 171 with the contact 170 thereby closing the electrode circuit. As a result the condenser is quickly discharged through the electrodes 151 and 153 thereby producing a recording mark on the electrolytic record sheet.

The drum electrode 151 or its drive is connected with the contact 145 by a transmission indicated by the dash and dot line 132 and also with a speed changing transmission 130 which, in turn, is connected with the movable potentiometer contact 125 through suitable coupling or connecting means denoted by the dash and dot line 131. Due to these connections the speed of rotation of the contact 145 is identical with that of the recorder drum 151. However, the transmission between the contact and the potentiometer is so chosen that the rotational speed of the potentiometer contact 125 is a multiple of that of the recorder drum in accordance with the number of pick-ups. In other words, in the illustrated example the transmission or speed-change gear 130 has a speed ratio of 3:1 so that the potentiometer contact 125 completes a full cycle of operation while the motion of the drum 151 and of the contact 145 covers only one third of a full rotation. The contact 145 of the device 140 passes from one to the next segment each time the potentiometer contact 125 has completed a full cycle. In other words, the three pick-ups 111, 112 and 113 are sequentially connected to the potentiometric device 120 so that three independent measurements and recordings are produced for each full revolution of the recorder drum. During each individual rotation of the potentiometer contact 125 a recording mark is written in the appertaining section of the recording sheet.

A chart as obtained by means of the above-described system is exemplified in Fig. 6. The electrolytic recording sheet is denoted by 190. The recording marks in each of the three sections of the sheet form three corresponding curves 191, 192 and 193, in accordance with the variable voltage magnitudes supplied by the three pick-ups 111, 112 and 113, respectively. 194, 195 and 196 are the corresponding zero lines. They are composed of point marks, each being recorded at a moment when the movable contact 125 passes over contact O at the beginning of each new cycle. The abscissae of each curve 191, 192 and 193 represent the frequency while the ordinates of each diagram are proportional to the pick-up voltage and hence indicative of the amplitude of vibration in the particular spot where the corresponding pick-up is located.

A test may be performed by starting the vibration generator, for instance the engine, of the aircraft structure under observation from a low speed of rotation up to the maximum of the available range of speeds. The measuring system is kept in operation during the period of increasing speed. The stylus member 153 advances from its starting position across the sheet, and during each cycle of rotation of the potentiometric device a recording mark is produced on the chart.

If the amplitudes of any recorded diagram exceed a safe limit or if the resonance curves of any diagram reveal increased amplitudes as compared with a record taken at a previous test, this is an indication that the tested structure has undergone some change or deterioration. Since the location of the pick-ups is known, the points of the tested structure where the increased or changed vibrations occur can easily be located. It is also apparent from the multiple record whether an increase in amplitude at certain frequencies occurs in all or several locations and hence is due to a more general defect, or whether the increase is limited to the particular spot of one pick-up and hence due to local causes. The width of the vibration maxima in each diagram indicates the magnitude of damping. Changes in damping also are indicative of changes in the mechanical properties of the structure and its materials.

The resistance steps of the resistance unit are preferably so dimensioned that the position of the moving contact, when deriving enough voltage to produce a recording mark, is in about linear proportion to the voltage generated by the pick-up. This can be obtained by graduating the steps of the unit so that their resistance value increases in each subsequent step. If a fairly strict proportionality between the pick-up voltages and recorded amplitudes is desired, the resistance value of each step should preferably be in accordance with the formula $$R_n = \frac{R_{max}}{n}$$

in which $R_{max}$ is the total resistance of the potentiometer unit and $n$ the number of the resistance step taken in the consecutive order in which they occur within the unit. The resistance value $R_{min}$ of the first step, i. e. the resistance of resistor 123 in Fig. 1, should be $$R_{min} = \frac{R_{max}}{m}$$

in which $m$ is the total number of steps.

A numerical example will elucidate these formulas. If $m=20$ steps are provided in a system with pick-ups for a maximum pick-up voltage, within the recording range, of 10,000 millivolts and with a relay whose threshold voltage is 50 millivolts, the total resistance of unit 121 may be chosen with 10,000 ohms and the individual steps dimensioned as is indicated in the following table, the resistance step number 20 representing the resistance value of the resistor 123, the subsequent step numbers referring to the next and subsequent subdivisions of the unit 121 as indicated in Fig. 1 of the drawings.

| Step No. | Resistance in ohms |
|---|---|
| 20 | 500 |
| 19 | 526 |
| 18 | 555 |
| 17 | 588 |
| 16 | 625 |
| 15 | 667 |
| 14 | 714 |
| 13 | 769 |
| 12 | 833 |
| 11 | 909 |
| 10 | 1,000 |
| 9 | 1,111 |
| 8 | 1,250 |
| 7 | 1,429 |
| 6 | 1,667 |
| 5 | 2,000 |
| 4 | 2,500 |
| 3 | 3,333 |
| 2 | 5,000 |
| 1 | 10,000 |

It will be understood that while I have described a particular non-linear gradation of the potentiometer units in order to obtain a proportional scale law, any other desired scale law is also obtainable by correspondingly graduating the resistance steps. For instance, a logarithmic amplitude scale is sometimes of value.

The resistances appertaining to the potentiometric contact device are preferably of the ohmic type, although inductive or capacitive potentiometers are also applicable. The amplifier and relay are so adjusted that with 50 millivolts at the input of the amplifier, the condenser charge is applied to the recording paper and hence a record point produced. With 1000 millivolts in the pick-up, one obtains 50 millivolts on the amplifier when the movable contact engages the contact step 20 and hence takes the potential from the first resistor (123) of 500 ohms.

If now the voltage generated in the pick-up is only 300 millivolts, the moving contact will find the necessary 50 millivolts at contact step 6 where the resistance is 1667 ohms, i. e. one sixth of the total 10,000 ohms. Consequently, a mark is recorded only after the moving contact 125 has moved from step No. 20 to No. 6. As a result the recorded amplitude corresponds now only to six resistance intervals, i. e. to six times the relay sensitivity.

If only 100 millivolts are supplied by the pick-up, the necessary 50 millivolts for effecting a recording mark appear at the contact No. 2 and the recorded amplitude is shortened correspondingly.

In summary, the above-described way of dimensioning ensures a linear proportionality between the measuring magnitudes and the amplitudes recorded on the chart.

Instead of providing an amplifier 166 between the potentiometric device 120 and the relay 167 it is also possible to insert amplifying means between the pick-ups and the potentiometer. The use of an amplifier at the location illustrated in the drawings has the advantage, however, that no linear amplification characteristic is required as it would be if the amplification step were located at the primary side of the potentiometric device.

It will also be understood that instead of using a potentiometric device with separate contacts and corresponding taps, an undivided or continuous type of resistance unit may be employed although it remains preferable to dimension the unit in accordance with a non-linear or hyperbolic rate of change of the effective resistance value along the path of motion of the movable contact.

Figure 2:
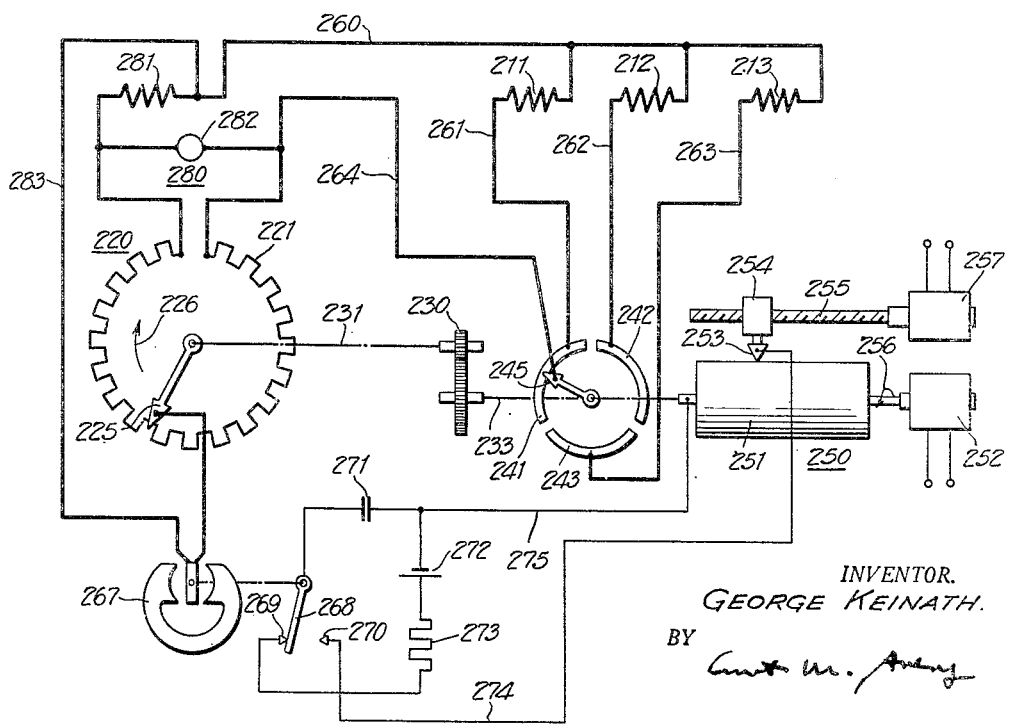

The embodiment illustrated in Fig. 2 represents a system designed for measuring magnitudes other than variable voltages.

Acording to Fig. 2, three variable circuit elements 211, 212 and 213 are provided whose resistance or impedance changes in accordance with the corresponding magnitudes to be measured. These three circuit elements are connected through corresponding leads 261, 262 and 263 with the segments 241, 242 and 243, respectively, of a contactor whose movable contact 245 is in connection with a measuring circuit 280 of the balanceable type, the connection extending over leads 260 and 264. The measuring circuit forms a Wheatstone bridge and includes a constant impedance member 281, a current source 282 (A. C. or D. C.), and the resistance member 221 of a potentiometric device 220 whose movable contact 225 lies in the zero branch 283 of the bridge in series arrangement with a relay 267 of the moving coil type.

The movable potentiometer contact 225 and the movable contact 245 of the contact device are connected with each other by means of transmissions 231 and 233, both denoted by dash and dot lines, which include a speed-change gear 230 so that the potentiometer contact performs three full rotations for each rotation of the contact 245. The contact device is also connected with the drum electrode of a recording mechanism 250 which is actuated by a drive motor 252 in the direction denoted by the arrow 256. The motor 252 operates with constant speed, i. e. in proportion to time. The stylus member 253 of the recording mechanism is also designed as an electrode. It is carried by a holder 254 which engages a threaded shaft 255 actuated by a motoric device 257 in accordance with a control magnitude.

The movable contact 268 of relay 267 cooperates with two stationary contacts 269 and 270. Condenser 271, a current source 272 and a resistor 273 are connected with the contacts 268 and 269 so that the condenser is charged from the source 272 when the movable contact 268 assumes the illustrated, attracted position. When falling off, the movable contact 268 disconnects the condenser from the charging circuit and switches over to contact 270 so that now the condenser is discharged through the leads 274 and 275 and the electrodes 253 and 251 of the recording mechanism. The discharge produces a recording mark on a current responsive recording paper placed on the drum member 251.

The operation of the recording device relative to that of the contactor and the potentiometric device 220 is similar to that of the corresponding elements described in the foregoing with reference to Fig. 1. An essential difference between the two systems, however, consists in the construction and operation of the measuring circuits. In the system according to Fig. 2 the bridge circuit is unbalanced when the contact 225 starts its cycle of operation. During its path of travel the contact 225 passes through a position in which the magnitude of the variable circuit element, then connected through the contactor with the bridge, is balanced. In this moment the current flowing through the zero branch 283 passes through the zero value. As a result, the relay 267 is de-energized and causes the contact 268 to discharge the condenser 271 through the electrodes and chart of the recording mechanism. Since at this moment the position of the potentiometer contact 225 is indicative of the value of the magnitude to be measured, the location of the recorded mark relative to the drum surface and recording chart is also indicative of that value. Consequently, despite the just-mentioned different operation of the measuring circuit, the results obtained and the appearance of the multiple diagram chart are similar to those of the system shown in Fig. 1 (see Fig. 6).

It will be apparent from the foregoing description that systems according to the invention are capable of diversified modification, for instance, instead of using a potentiometric device of ohmic type, a variable inductance such as a variometer, or a variable capacitor such as a variable condenser may be employed depending upon the particular characteristics of the measuring circuit or on the nature of the magnitudes to be measured. In all of those cases, a non-linear gradation of the variable element may be employed if a particular dependency of the recorded amplitudes on those of the measuring magnitudes is desired. For obtaining a linear proportionality between record and measuring magnitude, an inverse hyperbolic gradation, as represented by the foregoing numeric example, can be used to advantage. Some examples illustrating these possibilities will be discussed presently.

The measuring system shown in Fig. 3 contains a bridge circuit 385, 386 and 387 for each of the variable circuit elements 311, 312 and 313 respectively. These bridges are energized from a common current source 300 of either alternating or direct current. A contactor 340 and the resistor 321 of a potentiometer 320 are series-connected in the zero branch of the multiple bridge arrangement, by means of leads 361, 362, 363 and 364 so that only one of the bridge circuits is effective at a time depending upon the position of the movable contactor member 245 relative to the contact segments 341, 342 and 343. An amplifier 366 has its input circuit connected with lead 360 and with the movable potentiometer contact 325. The contacts 325 and 345 are actuated in synchronism and to this end connected by a transmission 331, symbolized by dot and dash lines, which includes a speed-change gear 330 or the like so that the potentiometer contact 325 completes a full cycle while the contact 340 passes over each of the contact segments. A transmission 332, also denoted by a dot and dash line, connects the contactor with the drum member of a recorder which is controlled by a pilot circuit in response to the operation of a relay energized by the amplifier 366. The recording mechanism, pilot circuit, and relay are not shown in Fig. 3 because they may be identical with the corresponding elements of Figs. 1 and 2.

When in operation, each bridge circuit 385, 386 or 387 is unbalanced in accordance with the variable magnitude of its control member 311, 312 or 313. Hence, the unbalance voltage effective across the potentiometer during each individual measuring cycle is a measure of the magnitude to be determined. Consequently, the voltage drop across the input terminals of the amplifier 366 is also dependent on the measuring magnitude. Since this primary amplifier voltage is also dependent on the position of contact 325 relative to resistor 321, the contact position in which the amplifier receives just enough voltage to operate the relay (threshold voltage) is indicative of the magnitude to be measured. Hence, a recording mark is produced by the recorder in much the same way as in the embodiment of Fig. 1. The resistor 321, though not necessarily requiring taps and contact steps, is preferably so rated that its resistance value changes at an increasing rate along the path of the potentiometer contact 325.

Fig. 4 is a simplified diagram of a measuring system in which the potentiometric device is of a capacitive type. As in the preceding example, the recording mechanism, pilot circuit and relay are omitted because they are similar to those previously described. Three voltage generating transmitters or pick-ups 411, 412 and 413 are connected through leads 461, 462 and 463 with corresponding segments 441, 442 and 443 respectively of a contactor 420. A lead 460 connecting the second terminal of the transmitters leads to a capacitive potentiometer whose other terminal is connected with the movable member 445 of the contactor 440. The capacitive potentiometer contains a variable condenser 420 and a constant condenser 420' connected in series. An amplifier 466 for controlling the relay of the pilot circuit has its input circuit connected across the constant condenser 420'.

The rotor of the variable condenser 420 is connected with the rotary contact 445 by a transmission denoted by the dot and dash line 432 which includes speed-change means (not illustrated in Fig. 4) as in the embodiments described previously. The condenser rotor and contact 445 are also coupled with the drum member of the recording mechanism, this being indicated by a dot and dash line 432.

When in operation, the rotor completes a full cycle of rotation during each of the three measuring periods, i. e. for each of the three points to be recorded during each revolution of the contact 445. The voltage drop $V_2$ across the condenser 420' varies in accordance with the phase position of the rotor of condenser 420. Hence, the position of the rotor at the moment when the transmitter voltage $V_1$ suffices to raise $V_2$ above the threshold value of the amplifier-relay arrangement, is in accordance with the magnitude to be measured. Since at this moment, the drum member of the recorder has a corresponding phase position relative to the recorder stylus, the recording mark then produced by the relay-controlled pilot circuit is also indicative of the measuring magnitude.

The capacity variation of condenser 420 is preferably so chosen that the effective capacity increases at an increasing rate similar to the conditions discussed in the foregoing with reference to the system of Fig. 1. Such a rating will be exemplified presently.

When the voltage $V_1$ from the measuring transmitter has its highest utilized value, say 100 millivolts, the ratio $V_1:V_2$ should also have its highest value so as to reduce $V_2$ to the threshold value at the beginning of the rotation of the condenser rotor. For instance, if the threshold value is 1 millivolt, the capacities $C_1$ and $C_2$ of condensers 420' and 420 should be approximately $$C_1:C_2 = 100, \text{ i.e. } C_2 = \frac{C_1}{100}$$

at the beginning of the potentiometric cycle. At a voltage $V_1 = 50$ millivolts, $V_2$ should have the threshold value of 1 millivolt at one half of the rotation, i. e. at an angular displacement of the rotor of 90°. In this position of the rotor, therefore, $C_1:C_2$ should be approximately 50, or $$C_2 = \frac{C_1}{50}$$

Similarly, for $V_1 = 50$ millivolts, $V_2$ should have the threshold value of 1 millivolt at 90% of the full rotation, i. e. at an angular displacement of 162°. Hence, the ratio of $C_1:C_2$ is approximately 10, or $$C_2 = \frac{C_1}{10}$$

With $V_1 = 2$ millivolts, $C_1$ should equal $C_2$ at a rotation of 180°.

The result of this dimensioning method is apparent from the diagram of Fig. 5 showing the capacity $C_2$ of the variable condenser 420 as a function of the ratio $C_1/C_2$ and the angular displacement $\alpha$ of the rotor or as a function of $C_1/C_2$ and $V_1$. The resulting capacity curve ($C_1$ in Fig. 5) has a relatively snarp bend. This can be obtained by cutting the rotor plates accordingly. Rotors of this type are similar to those employed in the known condensers for heat frequency oscillators. The required maximum to minimum ratio of capacity for $C_2$ can also be obtained in this manner.

If the range of measurement is chosen between 5 and 100 millivolts, instead of the above-assumed 2 to 100 millivolts, the steep rise of capacity towards the 180° (100 millivolts) end can be shortened so that the shape of the rotor plates is simplified correspondingly.

A condenser $C_2$ (420) with a maximum capacity of 1000 $\mu\mu f$ may be used so that at a frequency of 1000 cycles per second, the impedance range of $C_2$ (420) is from 150,000 ohms to several megohms. The fixed condenser $C_1$ (420'), which is preferably of higher capacity than $C_2$ (420) and may include the stator to ground capacity, would then have an impedance lower than 150,000 ohms. At a higher frequency of the measuring current, the impedance of the potentiometric capacitors would be lowered.

The system represented by the circuit diagrams shown in Figs. 7 and 8 is designed as a flight analyzer for airplanes. The portion of the system illustrated in Fig. 7 forms the transmitter and is disposed on the airplane. The portion shown in Fig. 8 is the receiver and located at a ground station. A system of this type may be used either for testing an airplane while performing a test flight or for the automatic transmission of other measuring values from the travelling airplane to the ground station.

The transmitting portion of the system, according to Fig. 7, contains a plurality of measuring elements, here exemplified by six voltage-generating coils or pick-ups 711 through 716. One terminal of each coil is connected through a common conductor 760 with one end of the resistance member 721 of a potentiometric device 720. The other end of this resistance member is connected with the movable contact 747 of a contractor 740 which has six contact segments 741 through 746 connected with coils 711 through 716 over leads 761 through 766 respectively. Lead 760 and the movable contact 725 of the potentiometer 720 are connected to the input terminals of an amplifier 766 for energizing a relay 790. A contact 780 disposed between the ends of resistance member 721 is temporarily engaged by the movable potentiometer contact 725 after the completion of each cycle and before starting another cycle. The contact 780 is connected with an auxiliary current source 766 which in turn is connected with conductor 760 so as to pass a current through the amplifier and relay each time the potentiometer contact starts a new cycle of operation.

A motoric drive 752 serves to actuate the potentiometer and contactor and to this end is connected with both by mechanical transmissions, denoted by the dot and dash lines 731 and 733, which include a gear 730 or the like mechanism for securing a speed ratio of 1:6 between contactor and potentiometer. In other words, the potentiometer contact 725 completes six rotations for each rotation of the potentiometer contact 747.

The movable armature contact 768 of the relay 767 controls a discharge circuit comprising a condenser 771, a current source 772 and a resistor 773. When at rest, the contact 768 engages the stationary relay contact 769 and causes the current source 772 to charge the condenser 771. When energized, the relay moves contact 768 over to stationary contact 770 and thus discharges the condenser 771 into the input circuit of a radio transmitter so that a short-lasting impulse is transmitted to the ground station. As a radio transmitter the usual radio apparatus of the airplane may be used.

The ground station contains the recording mechanism. The recording drum 751 is actuated by a motoric device 758. The appertaining stylus 753 is mounted on a holder 754 and displaceable along the drum by means of a threaded shaft 755 which is controlled by a motoric drive 757. Drum and stylus form electrodes for producing recording marks on an electrolytic recording sheet placed on the drum as described in connection with the foregoing embodiments. A radio receiver 791 has its output leads 774 and 775 connected with the recorder electrodes in order to energize them temporarily upon the reception of an impulse from the airplane transmitter 790.

The drive 757 operates in proportion to time, i. e. at constant speed. The drive motors 752 and 758 are synchronized preferably according to the start-stop method. Consequently, each position of the potentiometer contact relative to the resistance member 721 corresponds to a definite angular position of the drum relative to the stylus.

At the beginning of each cycle of operation the potentiometer contact, when engaging the contact 780, energizes the relay 767 thereby discharging the condenser 771. This causes an impulse to be sent from transmitter 790 to receiver 791. As a result, a zero mark is produced on the recorder chart. When now passing from contact 780 to the beginning of the resistance member 721, the contact 725 disconnects the current source 786 thus permitting the movable relay contact 769 to drop back to the illustrated position. This causes the condenser 771 to be recharged. The relay remains at first deenergized while the potentiometer contact continues to travel along the resistance member 721. However, as soon as the voltage drop, derived from the resistance member by the movable contact and passed to the amplifier, exceeds the threshold value of the relay, the latter responds and moves its contact 769 again towards contact 770. Now another impulse is transmitted to the receiving station and another mark recorded on the recording chart. The angular position of this mark, and hence its distance from the above-mentioned zero mark, is indicative of the instantaneous position of the potentiometer contact in the airplane and, consequently, of the magnitude to be determined. The marks thus recorded over a length of time form six curves on the recorder chart which are representative of the six variable magnitudes under observation.

When using the system for determining the conditions of the airplane structure during a test flight, one of the controlling circuit elements 711 through 716 is preferably designed to respond to the engine speed while the five others are vibration pick-ups as described in connection with Fig. 1. The diagrams obtained on the recording chart then permit a conclusion as to the vibration properties or strength of different parts of the tested plane structure in relation to different speed conditions.

A system as just described may also be used to advantage for supervising from a ground station the conditions of flight obtaining during a long distance or transoceanic flight. In this case the control elements 711 through 716 serve to measure such essential flight conditions as the altitude, fuel consumption, air speed, ground speed, etc. and are located and designed accordingly. A similar system may be employed for the continuous transmission of weather conditions at different localities and altitudes from a travelling airplane to a weather station.

In order to facilitate synchronizing the motoric devices 752 and 758, the motor 752 may be designed for continuous operation while the motor 758 operates in accordance with the start-stop principle. In this case the above-mentioned zero signal transmitted from the airplane to signal the zero position of the potentiometer may also be utilized for releasing the drive motor 758 so as to commence its cycle of operation. After the completion of this cycle, the motor 758 stops until it is again released by the next zero signal. The leads 759 establish the connection between the release mechanism (not shown) of the motoric device 758 and the receiver 791 necessary for the last-mentioned operation.

Aside from the above-mentioned advantages of a remote transmission system according to the invention, it will also be apparent that the weight to be carried by the airplane is also reduced to a considerable extent, since the entire recording unit proper is located at the ground station. Furthermore, the pilot and crew of the plane are relieved of the attention and attendance otherwise necessary as regards the measuring system. As a matter of fact, they can be informed through radio from the ground station of the various conditions of their flight continuously recorded at the station. The operation of the radio apparatus is not noticeably disturbed by the operation of the measuring and transmitting system since the above-mentioned signal impulses are of short duration and easily kept distinct from the ordinary radio transmission.

It will be understood that the numerical examples above-given represent merely embodiments of the invention and can be modified in accordance with the requirements of each particular case. Referring to Fig. 4, it should also be understood that while simple transmitter coils 411, 412 and 413 are illustrated, the variable control elements may also form part of one or more measuring networks, similar in principle to the bridge circuits 280 and 385 to 387 of Figs. 2 and 3 respectively, and preferably of the capacitive type. Modifications of such nature do not affect the essential operation of the potentiometer, contactor, recorder, and relay-controlled pilot circuit as will be apparent from the various systems described in the foregoing.

The variable potentiometric device, in particular the variable condenser 420, of the system shown in Fig. 4, may be arranged inside the drum member of the recorder for space, economy and shielding and the rotary member of the potentiometric device may be directly connected with the drum.

I claim:

1. System for recording a plurality of physical measuring magnitudes, comprising an electric circuit, a plurality of control elements connected with said circuit for producing control effects in accordance with said magnitudes respectively, potentiometric means disposed in said circuit for providing a variable voltage drop and having a movable member, cyclically operating drive means for actuating said movable member so as to cause said potentiometric means to vary said voltage drop once over a given range during each cycle of said drive means, a selective contact device arranged between said control elements and said potentiometric means for connecting said control elements sequentially with said latter means, actuating means for operating said contact device in a given speed relation to said drive means so as to cause said contact means to advance one step of its sequence for each cycle of operation of said drive means, a relay connected with said circuit so as to be actuated during each of said cycles when said voltage drop passes through a value which is in accordance with the control effect of the control element then connected to said potentiometric means, a recording mechanism having a member for accommodating a recording chart and a stylus member for producing a record on said chart, said two mechanism members being arranged for relative motion with respect to each other in two coordinate directions, means for imparting to said mechanism members relative motion in one of said directions simultaneously with the operation of said drive means in a given speed relation to said movable member, means for imparting to said mechanism members relative motion in said other direction, and electric circuit means disposed between said relay and said mechanism and controlled by said relay to cause said mechanism to produce recording marks in dependence upon the actuation of said relay.

2. System for recording a plurality of measuring magnitudes, comprising a corresponding plurality of control elements for varying an electric magnitude in accordance with said measuring magnitudes respectively, an electric circuit connected with said control elements, a variable impedance device disposed in said circuit and including a movable adjusting member for varying the impedance value of the device over a given range, said device having its impedance rated so as to have an increasing rate of change along the path of motion of said adjusting member, cyclically operating drive means connected with said adjusting member, a selective contactor arranged between said control elements and said device for connecting said control elements sequentially with said device, means for actuating said contactor in a given speed relation to said drive means for causing said contact means to select another one of said control elements after each cycle of operation of said drive means, a relay connected with said circuit so as to be actuated when the impedance of said device is in accordance with said electric magnitude of the selected control element, a recording mechanism having a chart-accommodating member and a stylus member movable relative to each other in two coordinate directions, means for imparting relative motion to said mechanism members in one of said directions simultaneously with the motion of said adjusting member and in a given speed relation thereto, means for imparting relative motion to said mechanism members in said other direction, and electric circuit means disposed between said relay and said mechanism for controlling the latter to produce recording marks in dependence upon the actuation of said relay.

3. System for recording a plurality of physical measuring magnitudes, comprising a corresponding plurality of control elements for varying an electric current magnitude in accordance with said measuring magnitudes respectively, an electric circuit connected with said control elements for measuring said current magnitudes, said circuit containing a relay and an adjustable potentiometric means for causing said relay to respond when the adjustment of said means is indicative of the current magnitude to be measured, said means having a single range of adjustment and containing a rotatable adjusting member, a selective contact device arranged between said control elements and said potentiometric means for connecting said control elements sequentially with said means, a recording mechanism having a cylindric recorder member for accommodating a recording chart and a stylus member for producing a record on said chart, said two mechanism members being arranged for motion relative to each other in two coordinate directions rotational and in parallel respectively as regards the axis of said cylindric member, actuating means for imparting relative motion to said mechanism members in said parallel direction, drive means connected with said adjusting member and said mechanism for rotating said adjusting member and simultaneously imparting relative motion to said mechanism members in said rotational direction and in a given speed relation to said adjusting member so that said adjusting member completes a plurality of full rotations for each full rotation of the chart, said contact device being connected with said drive means so as to be advanced one step in its sequential connecting operation for each full rotation of said adjusting member, and electric circuit means connecting said relay with said mechanism for controlling the latter, said circuit means having energy storage means and a current source arranged so that said storage means are charged when said relay is in non-responsive condition and discharged for causing said mechanism to produce recording marks when said relay is placed in responsive condition whereby a plurality of records is produced by said mechanism on said chart.

4. System for recording a plurality of physical measuring magnitudes, comprising a corresponding plurality of control elements for producing a control effect in accordance with said magnitudes respectively, an electric measuring circuit connected with said control elements for measuring said control effect and containing a relay and adjustable potentiometric circuit means for causing said relay to respond when the adjustment of said means is indicative of the control effect to be measured, said potentiometric means having a rotatable adjusting member, a selective contact device arranged between said control elements for connecting said control elements sequentially with said potentiometric means, a recording mechanism having a rotary recorder member for accommodating a recording chart and a stylus member movable relative to said rotary member, said rotary recorder member being mechanically connected with said contact device so as to operate simultaneously therewith, a mechanical speed-changing transmission arranged to connect said rotary recorder member with said adjusting member so that the latter rotates at multiple speed in proportion to the number of said control elements in order to vary the adjustment of said potentiometric means over its full range during each of the sequential contact periods of said contact device, drive means for actuating said interconnected recorder member, contact device and adjusting member, separate drive means for controlling the motion of said stylus member, and electric circuit means connecting said relay with said mechanism for controlling the latter to produce recording marks in dependence upon the response of said relay, whereby a plurality of records is produced by said mechanism on said chart.

5. System for recording a plurality of physical measuring magnitudes, comprising a corresponding plurality of electric circuit elements varying in response to said magnitudes respectively, a potentiometric device having a resistance unit divided into a series of resistance steps of different resistance values, the values increasing from one to the other end of the unit, and a potentiometer contact movable relative to said unit to vary the effective resistance of the potentiometric device successively in graduated steps, a selective contactor disposed between said circuit elements and said potentiometric device for connecting said circuit elements sequentially with said device, a recording mechanism having a movable recorder member for accommodating a chart and a stylus member movable along said former recorder member for producing a record on said chart, actuating means for moving one of said recorder members, drive means for moving the other recorder member and said potentiometer contact simultaneously at different speeds, the speed of said recorder member being a multiple of that of said contact in accordance with the number of said circuit elements, said contactor being connected with said drive means to be actuated in a fixed speed relation thereto in order to advance one step in its sequential operation for each rotation of said contact, a relay disposed between said potentiometric device and said recording mechanism for controlling the latter to produce recording marks on said chart when the voltage effective on the relay and derived from said resistance unit by said contact passes through a given value.

6. System for recording a plurality of physical measuring magnitudes, comprising a balanceable electric circuit, a plurality of control elements disposed to be connected to said circuit for providing a controlling voltage drop in accordance with said magnitudes respectively, potentiometric balancing means disposed in said circuit for providing a variable balancing voltage drop and having a movable control member, periodically operating drive means for actuating said member so as to cause said potentiometric means to vary said balancing voltage drop once over a given range of variation during each of the operating periods of said drive means, a selective contact device disposed between said control elements and said circuit for connecting said control elements sequentially and one at a time with said circuit, actuating means for operating said contact device in a given speed relation to said drive means so as to cause said contact means to advance one step of its sequence for each of said periods, balance-responsive relay means connected with said circuit so as to change its relay condition during each of said periods at a moment when said balancing voltage drop corresponds to said controlling voltage drop, a recording mechanism having a member for accommodating a recording chart and a stylus member for producing a record on said chart, said two mechanism members being arranged for relative motion with respect to each other in two coordinate directions, means for imparting to said mechanism members relative motion in one of said directions simultaneously with the operation of said drive means in a given speed relation to said movable member, means for imparting to said mechanism members relative motion in said other direction, and in proportion to time, and electric circuit means disposed between said relay means and said mechanism and controlled by said relay means to cause said mechanism to produce a recording mark at said moment.

GEORGE KEINATH.